US012211153B2

(12) United States Patent
Markas et al.

(10) Patent No.: US 12,211,153 B2
(45) Date of Patent: Jan. 28, 2025

(54) USE OF 3D/AI MODELS TO GENERATE 3D REPRESENTATIONS OF VIDEO STREAM USERS BASED ON SCENE LIGHTING NOT SATISFYING ONE OR MORE CRITERIA

(71) Applicant: Lenovo (Singapore) Pte. Ltd., Singapore (SG)

(72) Inventors: Anastassios Markas, Chapel Hill, NC (US); Rafael Marius Radkowski, Morrisville, NC (US); John W. Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 126 days.

(21) Appl. No.: 17/815,940

(22) Filed: Jul. 28, 2022

(65) Prior Publication Data
US 2024/0037859 A1 Feb. 1, 2024

(51) Int. Cl.
*G06T 19/00* (2011.01)
*G06T 13/40* (2011.01)
*G06T 17/00* (2006.01)
*G06V 10/60* (2022.01)
*G06V 10/82* (2022.01)
*G06V 40/16* (2022.01)
*H04N 5/272* (2006.01)

(52) U.S. Cl.
CPC ............ *G06T 19/006* (2013.01); *G06T 13/40* (2013.01); *G06T 17/00* (2013.01); *G06V 10/60* (2022.01); *G06V 10/82* (2022.01); *G06V 40/168* (2022.01); *G06V 40/174* (2022.01); *H04N 5/272* (2013.01)

(58) Field of Classification Search
None
See application file for complete search history.

(56) References Cited

U.S. PATENT DOCUMENTS

| | | | |
|---|---|---|---|
| 10,204,438 B2* | 2/2019 | Hushchyn | G06V 40/165 |
| 10,949,648 B1* | 3/2021 | Cao | G06V 40/161 |
| 11,194,995 B1* | 12/2021 | Profida Ferreira | G06V 40/169 |
| 11,455,829 B2* | 9/2022 | Rivard | G06V 10/758 |
| 2004/0032906 A1* | 2/2004 | Lillig | G06T 7/12 358/464 |
| 2004/0135788 A1* | 7/2004 | Davidson | G06T 15/00 345/530 |
| 2013/0050395 A1* | 2/2013 | Paoletti | H04N 7/142 348/E7.083 |

(Continued)

*Primary Examiner* — Ryan M Gray
(74) *Attorney, Agent, or Firm* — John M. Rogitz; John L. Rogitz

(57) ABSTRACT

In one aspect, a first device includes at least one processor and storage with instructions executable by the processor to receive input from a camera and to identify, based on the input from the camera, a first lighting condition of a scene showing a user. Responsive to the first lighting condition satisfying a first criterion, the instructions are executable to transmit a first video stream showing the user's face as captured by the camera to a second device. Responsive to the first lighting condition not satisfying the first criterion, the instructions are executable to use a model to generate a 3D representation of the user's face according to one or more parameters related to the user and to transmit a second video stream to the second device that shows the 3D representation. The model is also trained under lighting conditions satisfying one or more criteria.

20 Claims, 11 Drawing Sheets

(56) References Cited

U.S. PATENT DOCUMENTS

| | | | |
|---|---|---|---|
| 2015/0279113 A1* | 10/2015 | Knorr | G06T 7/11 |
| | | | 345/633 |
| 2018/0300927 A1* | 10/2018 | Hushchyn | G06V 40/167 |
| 2022/0232189 A1* | 7/2022 | Swierk | G06T 5/90 |
| 2022/0284663 A1* | 9/2022 | Ha | G06T 7/50 |
| 2023/0306610 A1* | 9/2023 | Nicholson | G06T 5/50 |

\* cited by examiner (Training)

USE OF 3D/AI MODELS TO GENERATE 3D REPRESENTATIONS OF VIDEO STREAM USERS BASED ON SCENE LIGHTING NOT SATISFYING ONE OR MORE CRITERIA

FIELD

The disclosure below relates to technically inventive, non-routine solutions that are necessarily rooted in computer technology and that produce concrete technical improvements. In particular, the disclosure below relates to use of 3D/AI models to generate 3D representations of video stream users based on scene lighting not satisfying one or more criteria.

BACKGROUND

As recognized herein, video quality for existing laptop computers and other devices can be very low due to sub-optimal characteristics of their image sensors. For instance, these sensors typically have relatively small pixel sizes and produce very low-quality images, particularly in low lighting conditions. To address this, these devices might extend the exposure time for the images they are generating, but this can lead to adverse technical consequences including a sub-optimal frame rate and increased image blurriness. There are currently no adequate solutions to the foregoing computer-related, technological problem.

SUMMARY

Accordingly, in one aspect at least a first device includes at least one processor and storage accessible to the at least one processor. The storage includes instructions executable by the at least one processor to facilitate a video conference, receive input from a camera in communication with the first device, and identify at least one lighting condition of a scene showing a conferee based on the input from the camera. Responsive to a first lighting condition of the at least one lighting condition satisfying a first criterion, the instructions are executable to transmit a first video stream from the camera to at least a second device different from the first device, with the first video stream showing the conferee's face as captured by the camera. Responsive to the first lighting condition not satisfying the first criterion, the instructions are executable to identify one or more parameters related to the conferee, use a model to either generate a three-dimensional (3D) representation or replace pixels using Neural Networks (NN) of at least part of the conferee's face according to the one or more parameters, and transmit a second video stream to at least the second device. The second video stream shows the 3D representation or the modified video of at least part of the conferee's face according to the one or more parameters.

In certain example implementations, the second video stream may also show part of a background as captured by the camera.

Additionally, in certain example embodiments the model may include a 3D model generated using facial data associated with the conferee as gathered prior to the video conference. Additionally or alternatively, the model may include an artificial intelligence model including one or more artificial neural networks trained for either generating the 3D representation or replacing pixels using training images gathered prior to the video conference.

The first criterion may relate to ambient light of the scene. Additionally or alternatively, the first criterion may relate to lighting of the conferee's face. For example, the first criterion may relate to directional light striking part of the conferee's face and/or to low lighting of part of the conferee's face.

In some example implementations, the one or more parameters related to the conferee may include distance of the conferee from the camera, facial pose of the conferee, head tilt of the conferee, and/or head orientation of the conferee.

In various example embodiments, the 3D representation as shown in the second video stream may be animated to correspond to actual facial movements of the conferee as captured by the camera.

Still further, in certain examples the second video stream may show a first part of the conferee's face according to the 3D representation, may show a second part of the conferee's face using modified data, and show a third part of the conferee's face according to images captured by the camera. Additionally or alternatively, the third video stream may replace the conferee's face as shown in images from the camera with either the 3D representation or the modified data.

Also in certain examples, the at least first device may include the camera.

In another aspect, a method includes receiving input from a camera in communication with a first device and identifying, based on the input from the camera, at least one lighting condition of a scene, the scene including a user. Responsive to a first lighting condition of the at least one lighting condition satisfying a first criterion, the method includes transmitting a first real-time video stream to a second device different from the first device, where the first real-time video stream shows the user's face as captured by the camera. Responsive to the first lighting condition not satisfying the first criterion, the method includes using a model to either generate a three-dimensional (3D) representation or modify pixels of at least part of the user's face according to one or more parameters related to the user and transmitting a second real-time video stream to the second device. The second real-time video stream shows the 3D representation or the modified pixel stream of at least part of the user's face according to the one or more parameters.

Thus, in certain examples the model may include a 3D model. If desired, in these examples the method may include applying blend shapes using the 3D model to represent different facial expressions made by the user as identified from the input from the camera.

Also in certain examples, the model may include an artificial intelligence model that itself includes one or more artificial neural networks.

Still further, in certain example implementations the model may be a first model and the 3D representation may be a first 3D representation. In these implementations, the method may include, responsive to a second lighting condition not satisfying a second criterion, using a second model to generate a second 3D representation of at least part of a background behind the user and transmitting the second 3D representation to the second device as part of the second real-time video stream. The second model may be different from the first model, the second lighting condition may be different from the first lighting condition, and the second criterion may be different from the first criterion.

In still another aspect, at least one computer readable storage medium (CRSM) that is not a transitory signal includes instructions executable by at least one processor to receive input from a camera in communication with a first device and identify, based on the input from the camera, at least one lighting condition of a scene. Responsive to a first lighting condition of the at least one lighting condition satisfying a first criterion, the instructions are executable to train a model to generate a three-dimensional (3D) representation of at least part of a user's face or a modified pixel stream generated by a neural network.

The details of present principles, both as to their structure and operation, can best be understood in reference to the accompanying drawings, in which like reference numerals refer to like parts, and in which:

DETAILED DESCRIPTION

Figure 1:
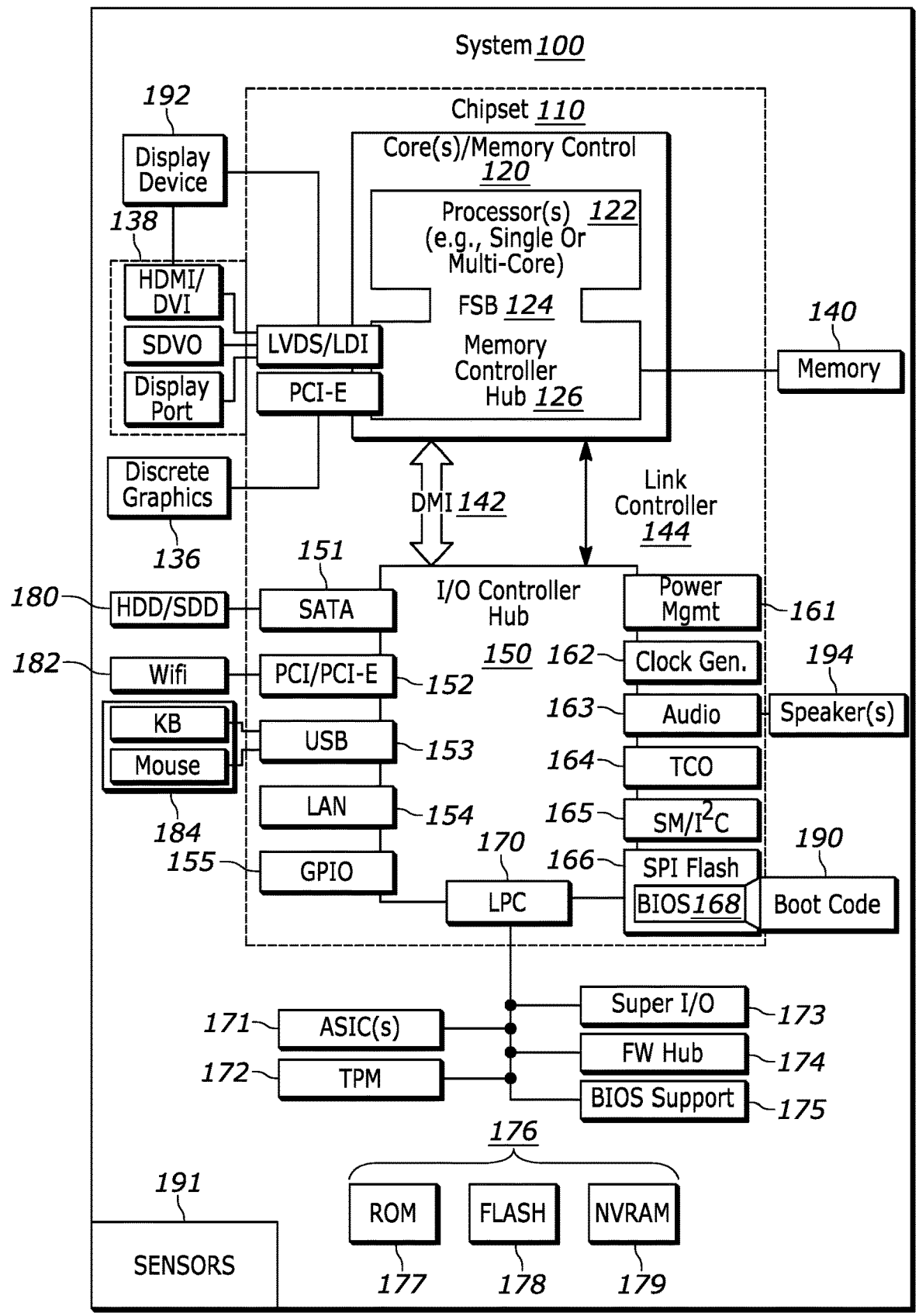
FIG. 1 is a block diagram of an example system consistent with present principles.

Among other things, the detailed description below describes techniques and devices for increasing video quality of a not-well-lit scene during video streaming using well-lit data obtained from the same scene. Video data may be captured during well-lit conditions when the image quality is very good, thus extracting good quality face data using computer vision to build a high quality 3D representation/rendering of a person's face that can later be superimposed on the live video feed when the live video feed does not meet certain quality criteria. The representation of the person's face can be stored as a 3D rendering image/model, and/or stored as an AI model.

Furthermore, video data may be captured during well-lit conditions when the image quality is very good, thus extracting good quality face data using computer vision to build a model of a person's face using NNs that can later be superimposed on the live video feed when the live video feed does not meet certain quality criteria. The representation of the person's face can be implicitly stored in the AI model build using NNs.

Thus, during a data acquisition/training phase, the device may detect that a scene can produce good quality images and then prompt the user to initiate training for high-quality image capture. The user may then be instructed to move his/her face left or right, forwards and backwards towards the camera, and to take other requested positions to get a good coverage of their face/entire face area. The user might also be instructed to create various facial expressions that are also being captured (such as a smile, laugh, etc.).

In addition to or in lieu of that, an automatic and/or continuous facial data acquisition mode or learning algorithm may be used where different poses and expressions are captured and reconstructed over time based on good quality images that are collected over time as the user does other things with their device.

With the facial data then captured, it may be processed to create and train a model. For a 3D reconstruction of the user's face, the user's face may be reconstructed based on the good quality images that have been collected, and blend shapes can also be identified and stored into the model. If desired, automatic acquisition may even be used to update the 3D model over time with new/updated data. For artificial intelligence (AI) modeling, the facial data may be used to create and train an AI model for the person's face that will be used later to improve the quality of the image. Additionally, here too automatic acquisition may be used to update the AI model over time with new/updated data.

Thereafter, during a real-time processing phase (e.g., for actual video streaming), when the user enters a video conferencing application and opens the camera, the device may first detect the conditions of the scene it sees with its camera. If the scene is well lit, the device may use the raw, default, and/or real-world video feed during the teleconferencing.

However, if the scene is not well lit, the device may detect the face of the user and extrapolate parameters such as distance from the camera, pose, tilt, orientation, etc. The device may then use the generated/trained 3D or AI model of the user's face to construct a corresponding virtual view of the face using high-quality data. If a 3D model in particular is being used, at this phase blend shapes can be also applied to capture the user's actual facial movement and expressions (subtle movements, speaking, laughing, etc.).

This corresponding view (the 3D representation) may then be superimposed on part of the actual camera video feed to create an enhanced view of the user as shown in the processed streaming feed.

Furthermore, the AI model can automatically correct areas of the face or the background of a scene given the condition that an area does not meet predetermined quality criteria.

What's more, the full or partial synthetic/virtual face surface can also be adjusted to take into consideration the actual light conditions surrounding the user in real-time. For example, during night, the synthetic face can be artificially darkened. Directional light can be also used to modify the synthetic view to create a more natural effect during nighttime by mimicking real-world directional light as striking virtual portions of the user's face just as it strikes corresponding real-world portions of the user's face. Other color adjustments can be also made to match the actual lighting conditions of the scene.

Additionally or alternatively, areas of the face that may have been over-exposed because of strong directional light can be replaced with high-quality data from the 3D/AI model to show a representation unaffected by the directional light (rather than mimicking the directional light itself).

The disclosure below also discusses the background in the video images being enhanced using similar methods.

Thus, in one aspect a method that improves video quality during conferencing may be used that includes training and processing phases. The training phase may include capturing images of the user using a camera, detect lighting conditions of the scene to determine the quality of the captured images, and if the quality of a captured image exceeds a certain threshold then the image may be added to the training set and then the training set of images is used to create a 3D model and/or AI model of the face. The processing phase may include capturing images of the user using the camera, detecting lighting conditions of the scene to determine the quality of the captured images, and if the quality of the captured images is below a certain threshold then the 3D or the AI model of the face may be used to create a higher-quality image utilizing higher-quality data extrapolated from the 3D/AI model.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together.

Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191 that may be used for video conferencing and other types of video streaming as described herein (as well as other purposes). For example, the sensors 191 may include an audio receiver/microphone that provides input from the microphone to the processor 122 based on audio that is detected, such as via a user providing audible input to the microphone to speak as part of a video conference for the audio to then be streamed in real time to other devices as part of a video conference. The sensors 191 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video of a user's face to stream in real time to other devices as part of a video conference.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
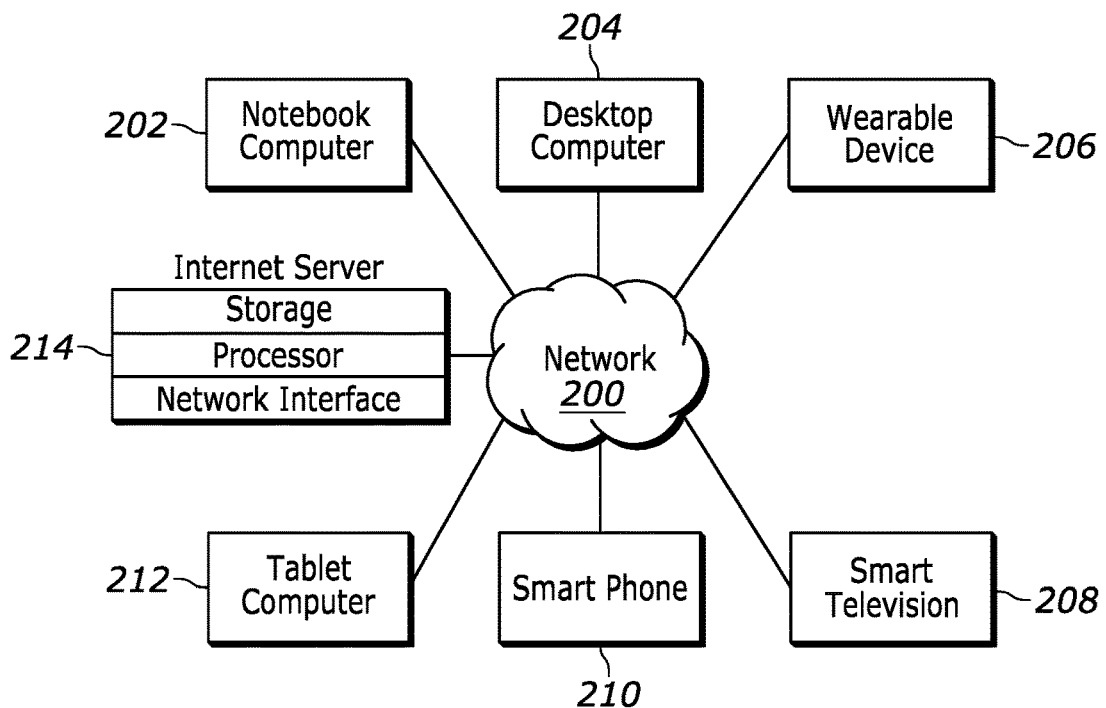
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles (e.g., stream real-time video captured by a digital camera on each device to each of the other devices).

Figure 3:
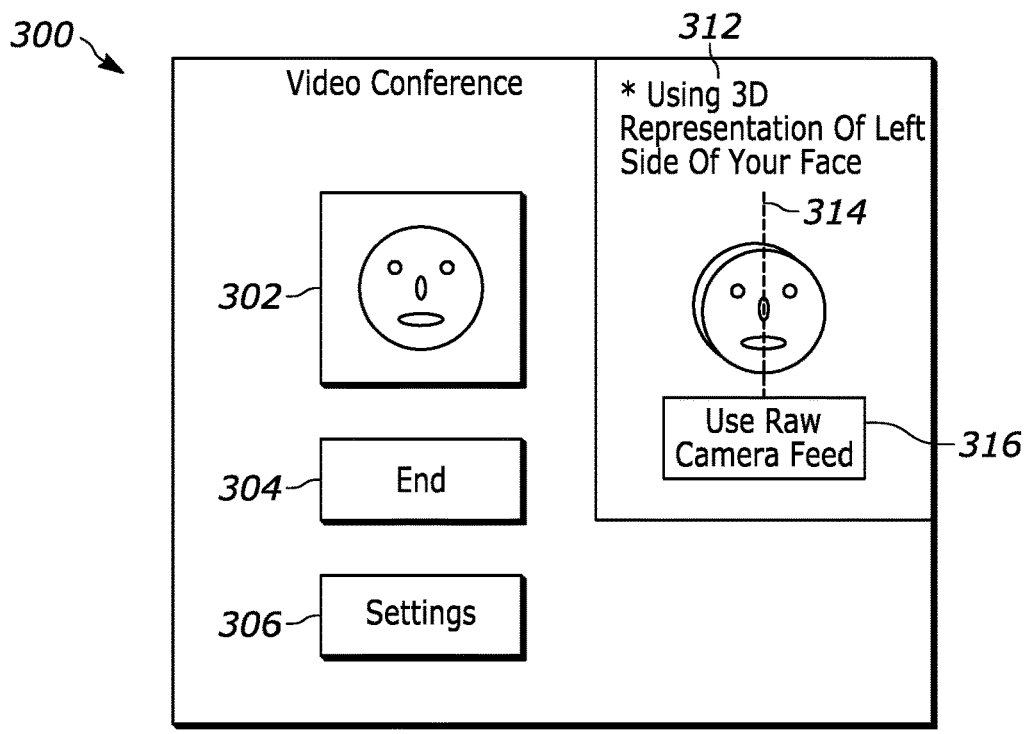
FIG. 3 is an illustration of an example where part of a real-world video of a user's face is replaced with a virtual portion during video conferencing based on one or more identified lighting conditions consistent with present principles.

Now in reference to FIG. 3, suppose an end-user is using his or her client device to participate in a video conference with one or more other conferees. The client device may therefore include at least one camera for generating video of the user to stream to the other conferees. The client device might be a smartphone, laptop computer, wearable device, or headset, for example.

FIG. 3 itself shows an example graphical user interface (GUI) 300 that may be presented on the display of the user's client device as part of the video conference. The GUI 300 may present a real-time video stream 302 of the other conferee(s), an end selector 304 that is selectable to end the video conference, and a settings elector 306 that is selectable to present a settings GUI such as the GUI 1100 that will be described later.

As also shown in FIG. 3, the GUI 300 may include a section 310 that may be dynamically presented/updated responsive to the client device and/or a remotely-located coordinating server identifying one or more insufficient lighting conditions. Based on identifying the one or more lighting conditions, the client device and/or server may begin generating and inserting a three-dimensional (3D) virtual representation of the user into the user's video stream as transmitted to the other conferees to help the other conferees adequately view the user notwithstanding the identified suboptimal lighting condition(s). Thus, a shown, the section 310 may include a text indication 312 indicating that the 3D representation is being used to replace the portion of the video stream showing the user's real-world left side of their face. A demonstrative line 314 indicates the division, with the right side of the user's face still being presented using actual real-world images of the user from the camera feed itself and the left side of the user's face being replaced with the virtual 3D representation. The line(s) delineating real-life image portions from virtual image portions may or may not actually be presented on the GUI 300, depending on desired implementation.

As also shown in FIG. 3, the section 310 may include a selector 316. The selector 316 may be selectable to command the client device to stop using the virtual 3D representation and to instead simply provide the real-world, real-time camera feed itself to the other conferee(s) without virtual/3D representations being inserted.

Figure 4:
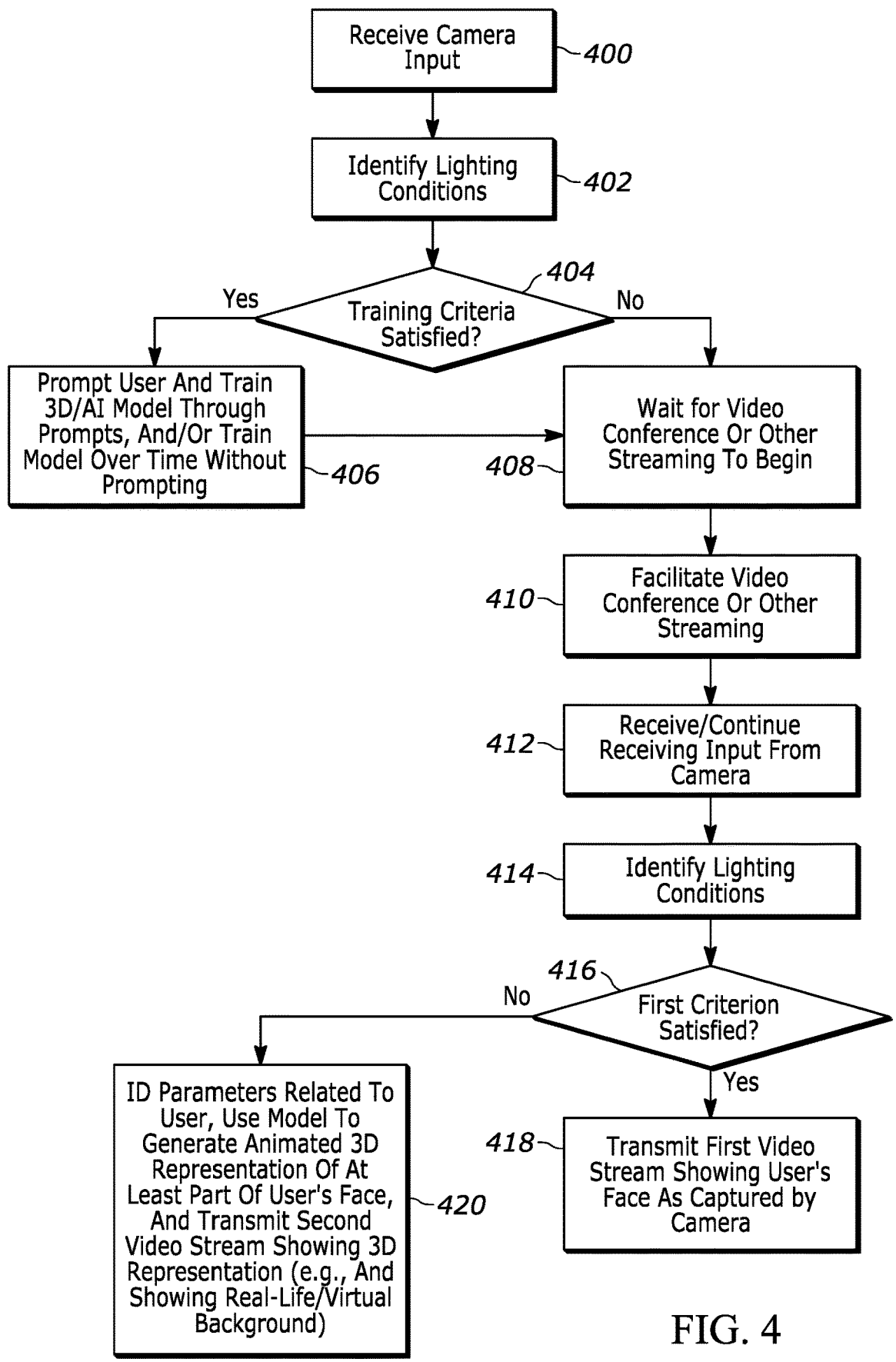
FIGS. 4 and 12-15 illustrate example logic in example flow chart format that may be executed by a device consistent with present principles.

Referring now to FIG. 4, example logic consistent with present principles is shown that may be executed in any appropriate combination by one or more devices (such as the system 100, a client device participating in a video conference, and/or a remotely-located coordinating server operating a video conferencing system). Note that while the logic of FIG. 4 is shown in flow chart format, other suitable logic may also be used. Also note here that while the video conferencing system may be hosted/executed at the coordinating server itself, in some examples it may also be executed at one of the client devices if desired (e.g., in peer-to-peer networking environments where the AV feeds from each conferee's client device are not routed through the server to other conferees).

Beginning at block 400, the device may receive input from a camera on the user's client device. Then at block 402 the device may identify one or more lighting conditions of a real-life scene shown in the input/images to, at decision diamond 404, determine whether one or more training criteria have been satisfied. For example, one training criterion might relate to ambient light so that if ambient light shown in the camera images is above a low-light threshold then the criterion is satisfied. Another criterion might be whether a signal to noise ratio (SNR) for the camera images is higher than a threshold SNR ratio. Other heuristic methods and/or objective image quality assessment techniques for evaluating image quality may also be used, including no-reference image quality assessment techniques.

Responsive to a negative determination at diamond 404, the logic may proceed directly to block 408 as will be described in a moment. However, first note that responsive to an affirmative determination at diamond 404 (that the one or more training criteria have been satisfied), the logic may proceed to block 406. At block 406 the device may prompt the user to engage in a series of interactive steps so that computer vision can be executed to capture different facial poses and characteristics of the user (e.g., facial feature points, facial landmarks, facial structures, etc.). This in turn may be used by the device at block 406 to generate and train a 3D model and/or artificial intelligence (AI) model that is to be used for generating a virtual 3D representation of the user's face.

If a 3D model is used, the 3D model may be generated using solid or shell modeling. Polygonal modeling, curve modeling, and/or digital sculpting may be used. Photogrammetry may also be used. In some examples, an infrared (IR) laser rangefinder may even be used alone or in combination with the input from the client device's camera to identify spatial coordinates/relationships for different aspects of the face as well as other facial data to then build the 3D model. Moreover, various artificial intelligence engines may themselves be used to generate the 3D model itself. Programs may be used such as Blender, Cinema 4D, Modo, 3ds Max, RealityCapture, Metashape and 3DF Zephyr. Further note here that various blend shapes may be generated/learned during training and then stored for application later to the 3D model to represent different facial expressions made by the user during a video conference or other livestream.

If an AI model is used, the AI model may include one or more artificial neural networks (ANNs) trained for generating a 3D representation using training images as input that were gathered prior to the video conference (or other real-time livestream of the user's face). The one or more ANNs may each include an input layer, an output layer, and multiple hidden layers in between that that are configured and weighted to make inferences for an appropriate output, and so the layers/nodes may be altered or weighted differently as part of the training. The training itself may include supervised learning, unsupervised learning, semi-supervised learning, reinforcement learning, feature learning, self-learning, and other forms of learning. Back propagation with loss functions may be used for training, for example. Moreover, note that in certain examples the AI model may be made up of multiple ANNs so that a first ANN may identify facial structures as well as camera pose/camera position with respect to the face based on the camera input itself. A second ANN may then take the facial features and landmarks, accounting for camera pose/position, and generate a live 3D representation of the user's actual facial poses and movements from the perspective of the current actual camera pose/orientation.

Still in reference to block 406, further note that at this block in addition to or in lieu of the interactive training referenced above, the device may also train the model over time as a background process without direct user training interaction. This may be done by using images from the camera received over time while the user does other things with the client device besides livestreaming, but where the camera images are still determined to have good image quality, to thus initiate and train the 3D/AI model using those images.

From block 406 the logic may then proceed to block 408. At block 408 the device may wait for a video conference or other type of live video streaming to begin for which video from the client device's camera will be used. Other example types of video streaming include social media livestreams, video sharing website livestreams, video game player livestreams, etc. It is further noted here that present principles involving use of 3D/AI models to replace part or all of real-world images of a user's face may also be used for stored, non-live video (for example, videos uploaded to social media or a video-sharing web site).

The logic may then move from block 408 to block 410 where, according to the present example, the device may facilitate a video conference by transmitting audio video (A/V) content and metadata between conferencing devices. For example, the client device may transmit its local camera and microphone streams to other devices in real time and also receive camera and microphone streams from the other client devices of other conferees for local real time presentation. Additionally or alternatively, at block 410 the coordinating server may route the A/V communications between the client devices and control one or more conferencing-related GUIs presented locally at the client devices themselves.

From block 410 the logic may then proceed to block 412. At block 412 the device may receive or continue receiving input/images from the camera. Then at block 414 the device may identify one or more lighting conditions of the real-life scene/environment shown in the images to, at decision diamond 416, determine whether one or more lighting condition criteria are satisfied. For example, a first criterion might relate to ambient light so that if ambient light shown in the camera images is above a low-light threshold (or below a high-light threshold) then the first criterion is satisfied. A second criterion might be whether a SNR or peak SNR for the camera images (or a certain area of the images) is higher than a threshold SNR ratio. Other heuristic methods and/or objective image quality assessment techniques for evaluating image quality may also be used, with the previously-received (and stored) images of the user's face and background as used for training at block 406 being usable as reference images/ground truth (no-reference image quality assessment techniques also being useable as desired consistent with present principles). For example, mean square error, universal quality indexing, structural similarity indexing, and/or feature similarity indexing techniques may be used to determine whether a developer-designated criterion related to them is satisfied.

Thus, in certain example implementations the foregoing techniques may be used to determine whether one or more criteria have been satisfied that relate to a specific type of lighting condition for the user's face in particular. For example, the criteria may relate to low lighting for all or part of the user's face, and/or directional light from a lamp, computer screen, or other light source striking part of the user's face.

Responsive to an affirmative determination at diamond 416, the logic may proceed to block 418 where the device may transmit to the other conferencing client devices (and/or store) a first video stream showing the user's face as captured by the camera itself. Thus, the first video stream may not overlay, project, or include any part of a virtual 3D representation of the user's face as might be generated using the trained 3D/AI model.

However, responsive to a negative determination at diamond 416, the logic may instead proceed to block 420. At block 420 responsive to the identified conditions not satisfying the one or more criteria, the device may identify one or more parameters related to the user. The device may use computer vision and the input/images from the camera to do so, and the one or more parameters may include a distance of the user from the camera itself, facial pose of the user, head tilt of the user, and head orientation of the user. With these parameters then being known, at block 420 the device may also deploy the pre-trained 3D/AI model to generate an animated, virtual 3D representation of some or all of the user's face according to the one or more parameters, or a reconstructed view of the user's face using NNs. The 3D representation may also be generated to present a certain perspective of the user's face that matches a current perspective of the user as captured from the actual, real-world camera pose/orientation of the camera itself.

For example, the user's entire real-world face as shown in the video may be replaced with the 3D representation, or only part of the user's face subject to bad lighting (e.g., too much or too little) may be replaced with the 3D representation. E.g., portions of the user's face as shown in the video that have an SNR below a certain threshold may be replaced with corresponding parts of the 3D representation so that, where possible, as much as possible of the real-world camera view of the user's real-world face is used to further enhance the life-like appearance of the video that is ultimately sent to the other client devices (while the 3D representation makes up for real-world lighting shortfalls that over-expose or under-expose only certain parts of the user's face as shown in the video).

As for replacing all of the real-world view of the user's face with the 3D representation, the device may use computer vision to identify the user's real-world facial and head movements. The device may then overlay or project the 3D representation into the video and map movements of the 3D representation to the actual corresponding user movements in real time so that the 3D representation moves in the same way as the user's face does in the real-world. Here the 3D representation may be presented with better light/contrast than the real-world face it replaces, such as presenting the 3D representation per the lighting conditions used during training at block 406. Also note here that the 3D representation may be processed to conform not just to facial pose of the user, head tilt of the user, and head orientation of the user but also so that the 3D representation of the user's face appears in the video to be located the same distance from the user's camera as the user's actual face. E.g., virtual head area and distance for the 3D representation may be matched using augmented reality software to the real-world head area and distance as shown in the video.

If only some of the real-world view of the user's face is to be replaced with the 3D representation, the device may use image processing software to not just map real-world face/head movements as described above but also to match brightness and saturation of virtual portions from the 3D representation with the corresponding real-world portions in real time, save for possibly not going above or below a brightness or saturation threshold since otherwise the virtual image may not improve much upon the poorly-lit real-world view of the user's face. Thus, the color values of the real and virtual portions of the user's face may be blended/matched to give a life-life impression to the 3D-represented portions. But further note here that other aspects of the partial 3D representation may still also be adjusted as described above based on the identified parameters, such making the 3D representation appear to be located a same distance from the camera in real space as the user's real-world face itself.

Also note in terms of block 420 that regardless of whether all or part of the face is being replaced, in examples where a 3D model in particular is being used, the device may identify the user's actual facial features/movement in real time and align the 3D model using the blend shapes generated during training to match the user's facial expressions. Thus, if the user smiles, then a blend shape smile is used. If the user's eyes move to the left, the 3D model's eyes may move to the left and blend shapes for corresponding face muscle movements may be applied. For implementations where an AI model is used rather than a 3D model, the AI model itself may be used to produce the 3D representations (images) as video that maps the user's actual real-world facial movements without the need for applying blend shapes.

Still in reference to block 420, as indicated above the device may ultimately transmit, to the other conferencing devices as a second video stream, the blended video of the real-world image portions with the animated 3D representation of some or all of the user's face according to the one or more parameters.

Still in reference to block 420, as indicated above the device may ultimately transmit, to the other conferencing devices as a second video stream, a NN-generated representation of some or all of the user's face according to the one or more parameters.

Before moving on to other figures, it is to be further understood in reference to FIG. 4 that in some examples, poorly-lit areas of the real-world background behind the user as captured by the user's camera may also be replaced with either static image data of the background as previously acquired by the camera or even a 3D/AI model of the background as previously generated using the camera. If a 3D/AI model of the background is used to provide 3D representations of some or all of the background, it may be different from the 3D/AI model for the user themselves. The static background images or 3D background model may thus be used to replace over-lit or under-lit areas of the user's real-world background as shown in the video during the video conference/livestream. Additionally, note that the over-lit or under-lit areas themselves may be identified using the same image quality assessment techniques described above (e.g., SNR).

If a background 3D/AI model is used to replace some of the real-world background, further note that it may been generated and trained similar to the process set forth above at block 406 before the video conference/livestream begins and while lighting conditions satisfy the training criteria. Thus, in some examples at block 420 the device may identify parameters for various real-world objects shown in the background per the camera feed and use the background 3D/AI model to generate a 3D representation of one or more of the objects or areas of the background that do not satisfy one or more criteria as determined at diamond 416 for those respective objects/areas. All of the background or only portions that do not satisfy the criteria at diamond 416 may be replaced with virtual portions per the 3D representation (as adjusted for camera distance and other identified parameters) to then transmit the real/virtual background hybrid as part of the second video stream along with the 3D representations of the user themselves as inserted into the same video frames for the second video stream.

Figure 5:
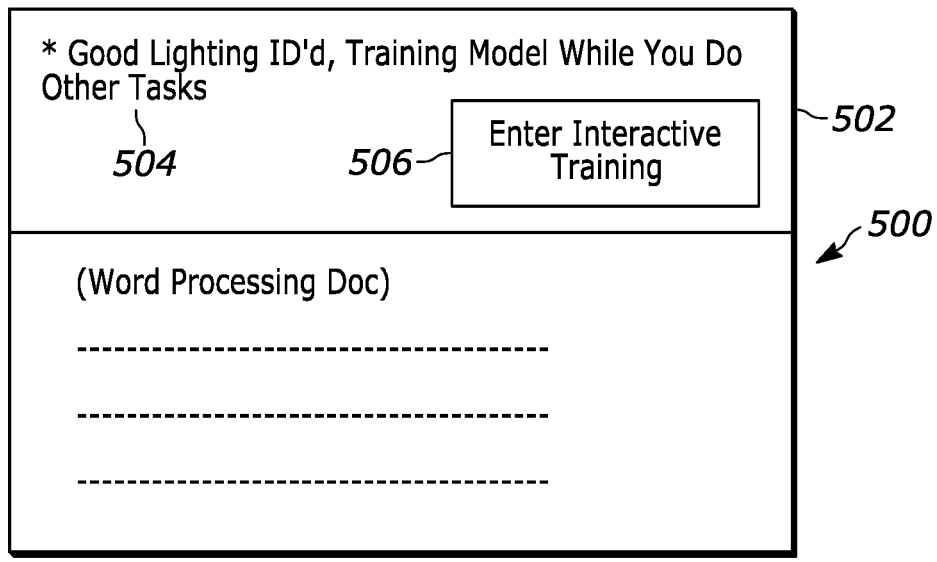
FIGS. 5-10 demonstrate various steps in training processes that can be used to train a 3D or AI model that may be used for generating a virtual representation of some or all of a user's face during real-time video streaming consistent with present principles.

Continuing the detailed description in reference to FIG. 5, an example graphical user interface (GUI) 500 is shown. The GUI may be presented on the display of the user's client device, and in this case the GUI 500 includes a word processing document on which the user is working. Note that responsive to one or more lighting criteria being satisfied (e.g., as determined at diamond 404), the GUI 500 may dynamically update to present a section 502.

As shown in FIG. 5, the section 502 may include a text indication 504 that good lighting conditions have been identified and that, as a result, the 3D/AI model of the user's face is being trained while the user continues with other tasks such as typing into the word processing document. Thus, the training may be done in the background while the user works on other electronic tasks. And again, it is to be further understood that a background 3D/AI model for 3D representation of the user's background may also be trained while the user works on other tasks or, at the very least, static images of the background gathered while the lighting is favorable.

Note, however, that in addition to or in lieu of training in the background as described above, the user may select the selector 506 to begin an interactive training process as also set forth above. Accordingly, responsive to selection of the selector 506, the device may present the GUI 600 of FIG. 6 or GUI 700 of FIG. 7. But further note that in some examples, the GUI 600 of FIG. 6 may also be presented autonomously by the user's client device responsive to determining that one or more lighting criteria are satisfied without the user selecting the selector 506.

Figure 6:
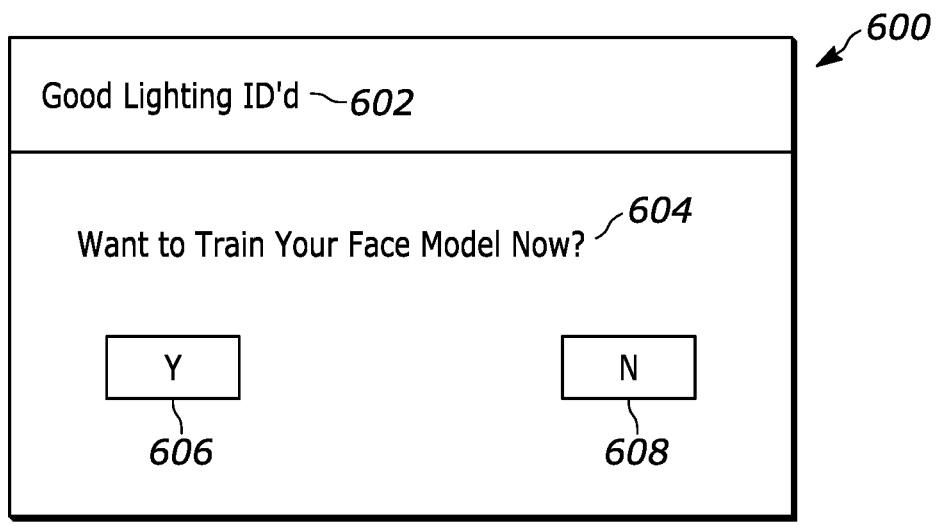

In any case, the GUI 600 as shown in FIG. 6 may include an indication 602 that good lighting around the user has been identified as well as a prompt 604 asking whether the user wants to train a model of their face through the interactive process. The "yes" selector 606 may then be selected to command the device to begin the process, or the user might select the "no" selector 608 to exit the GUI 600 and return to another most-recently presented GUI.

Figure 7:
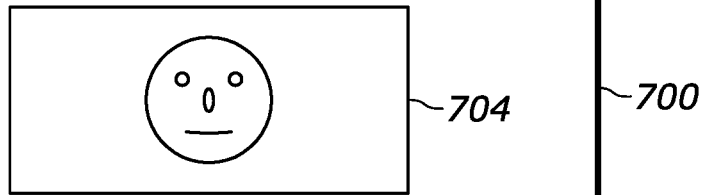

Assuming the user selects selector 606, the interactive training may begin with presentation of the GUI 700 of FIG. 7. As shown, the GUI 700 may include a prompt 702 for the user to move their head left, right, up, down, forward, and backward in that particular order so that supervised training may be performed on the model using respective labels for the respective head movements. If desired, a real-time video stream 704 of the user themselves may be presented as part of the GUI 700.

Figure 8:
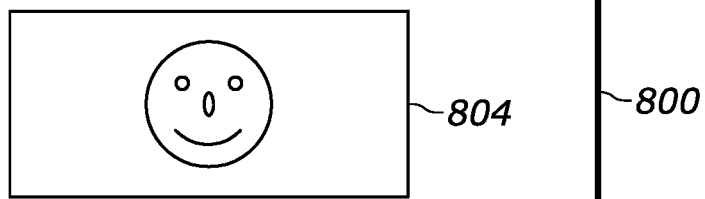

Then responsive to the computer vision algorithm executed by the device determining that the user has performed the various head movements in the requested order, the device may present the GUI 800. As shown in FIG. 8, the GUI 800 may include a prompt 802 for the user to smile so that the computer vision software can track the user's facial movements to train the model using identified landmarks and feature points as well as interrelationships between the landmarks and feature points. The device might even generate/train blend shapes of various stages of the smile if a 3D model in particular is being trained. And again note that a real-time video stream 804 of the user may be presented as part of the GUI 800.

Figure 9:
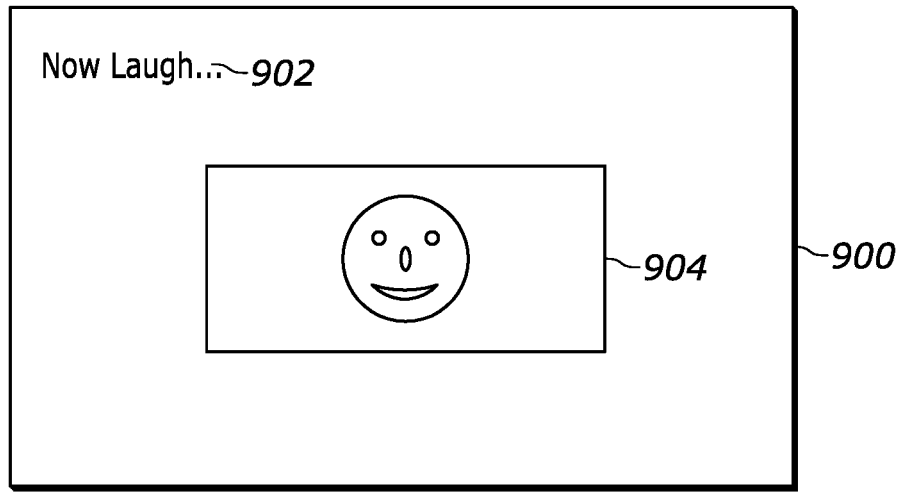

Based on the computer vision algorithm determining that it has gathered enough facial data of the user smiling, the GUI 900 of FIG. 9 may then be presented. As shown, the GUI 900 may include a prompt 902 for the user to laugh to further train the model similar to as already described above for the smile, but this time with additional facial data related to the user's laugh. Here too note that a real-time video stream 904 of the user may be presented.

Figure 10:
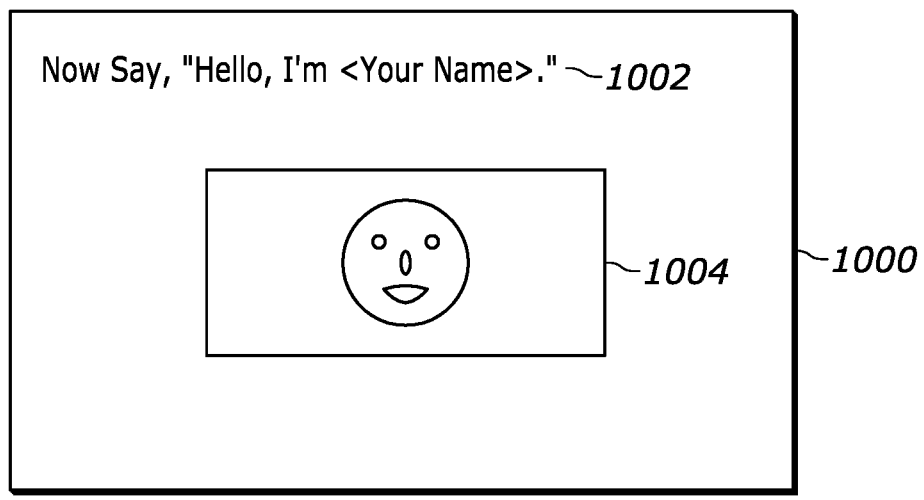

Thereafter, based on the computer vision algorithm determining that it has gathered enough facial data of the user laughing, the GUI 1000 of FIG. 10 may be presented. As shown, the GUI 1000 may include a prompt 1002 for the user to speak a predefined phrase such as "Hello, I'm [user's name]" to further train the model similar as already described above using additional facial data related to the user speaking certain words. And here again a real-time video stream 1004 of the user may be presented.

Depending on implementation, additional GUIs might be presented for further training of the model, such as additional GUIs for the user to speak other phrases or make other facial gestures.

Figure 11:
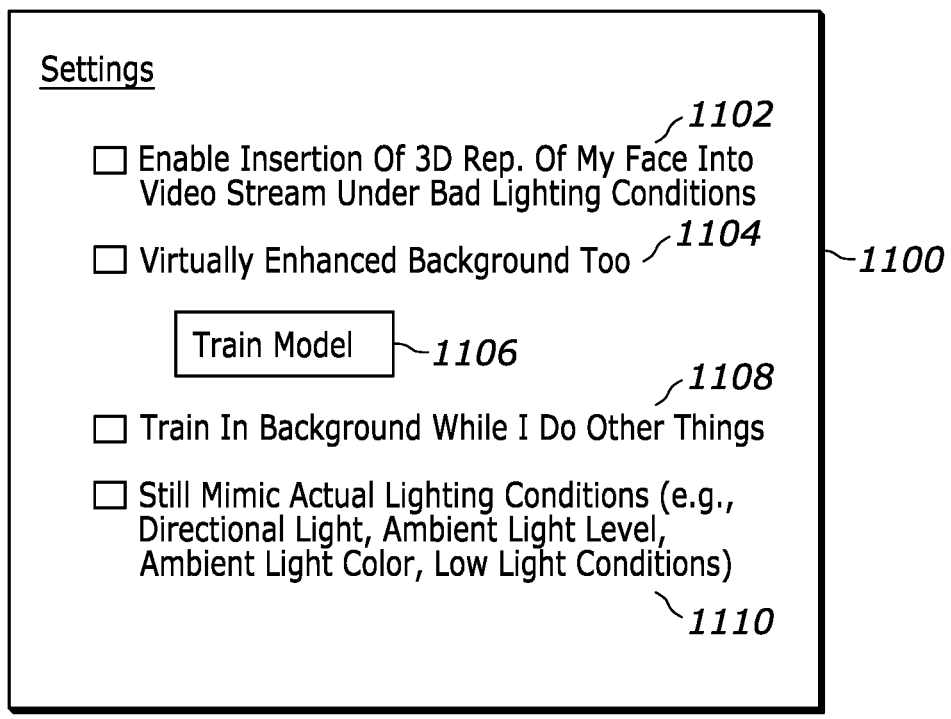
FIG. 11 shows an example settings GUI that may be presented on a display to configure one or more settings of a device to operate consistent with present principles.

Now in reference to FIG. 11, an example GUI 1100 is shown that may be presented on the display of a client device to configure/enable one or more settings related to video conferencing or other video streaming consistent with present principles. The settings GUI 1100 may be reached by navigating a settings menu of the device or a dedicated app menu for a given video conferencing service, for example. Also note that in the example shown, each option discussed below may be selected by directing touch or cursor input to the respective check box adjacent to the respective option (with it being further noted that other selectors/options discussed for the other GUIs above may be similarly selected using touch, cursor, or other input).

As shown in FIG. 11, the GUI 1100 may include an option 1102 that may be selectable a single time to set or configure the device/conferencing system to enable blending of a virtual representation of the user with real-world video using a 3D/AI model when lighting conditions are unfavorable as set forth herein. For example, selection of the option 1102 may configure the device to execute the logic of FIG. 4 as well as to execute the other actions described above in reference to FIGS. 5-10 in multiple future streaming instances over time.

As also shown in FIG. 11, the GUI 1100 may include an option 1104 to specifically set the device to enable blending of virtual representations of the user's background with real-world video of the background when lighting conditions are unfavorable as set forth herein.

In certain examples, the GUI 1100 may also include a selector 1106 that may be selectable to initiate an interactive training process as described herein. For example, selection of the selector 1106 may command the device to present the GUI 600 of FIG. 6 or to even skip ahead to the GUI 700 of FIG. 7.

Also if desired, in some implementations the GUI 1100 may include an option 1106 that may be selectable to specifically set the device to train the model(s) being used as a background process while the user does other tasks under favorable lighting conditions (in addition to or in lieu of the interactive training).

As further shown in FIG. 11, the GUI 1100 may include an option 1110 that may be selectable to set the device to, when presenting 3D representations of the user's face and/or background, still mimic actual real-world lighting conditions identified from the camera feed as well. For example, directional light striking a certain side or area of the user's face may still be mimicked at corresponding facial locations of the 3D representation. Similarly, ambient light levels and colors may be mimicked as well as low light conditions.

Figure 12:
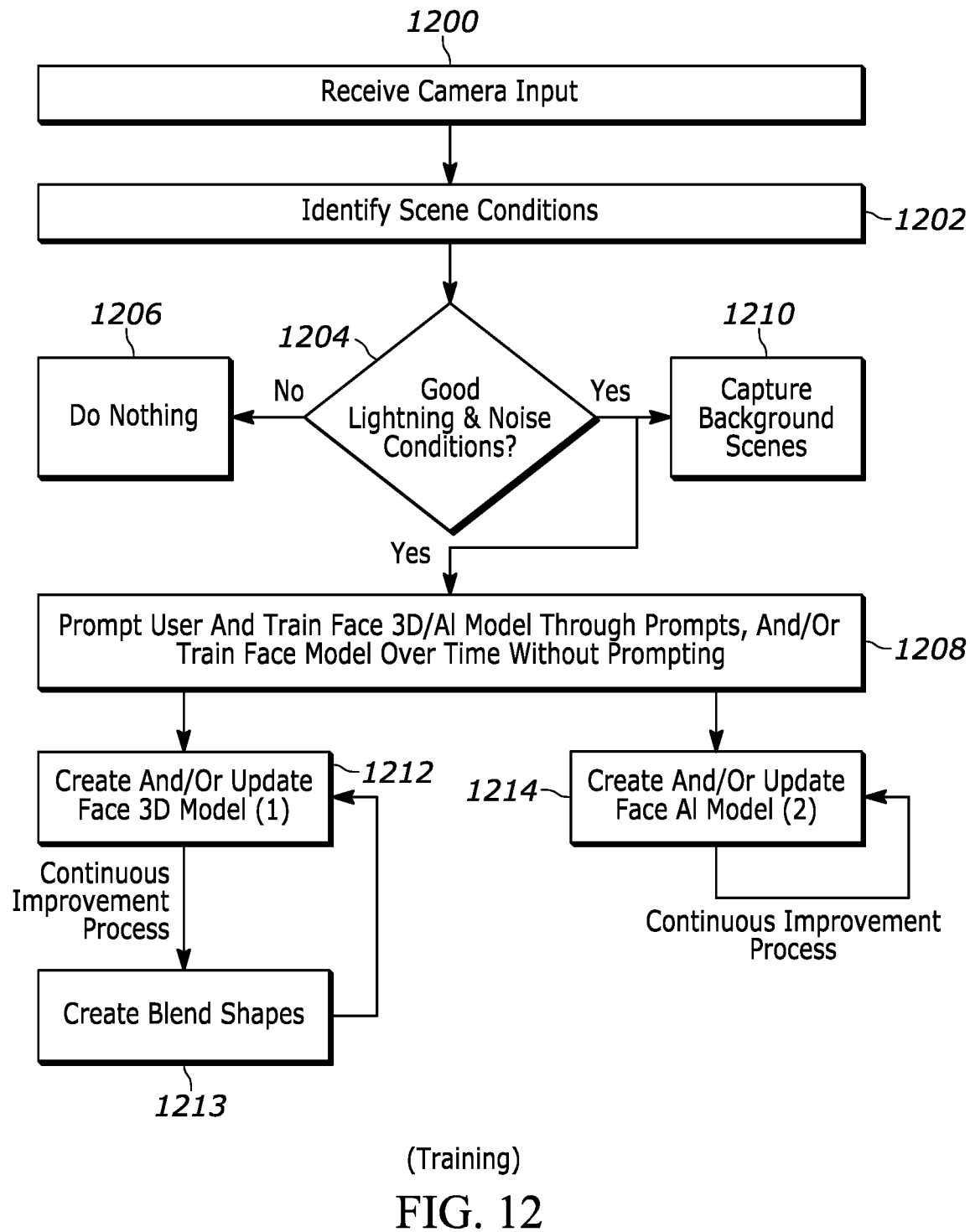

Now in reference to FIG. 12, additional logic is shown that may be executed consistent with present principles, such as for training as described herein. Beginning at block 1200, the device may receive camera input similar to the process set forth above for block 400. The logic may then proceed to block 1202 where the device may identify scene conditions similar to the process set forth above for block 402.

Thereafter, the logic may proceed to decision diamond 1204 where the device may determine whether the images from the camera have good lighting and noise conditions. Responsive to a negative determination at diamond 1204, the logic may proceed to block 1206 and end/do nothing. However, responsive to an affirmative determination at diamond 1204, the logic may instead proceed to blocks 1208 and 1210. At block 1208 the device may prompt the user and train the face 3D/AI model through prompts, and/or may train the face model over time without prompting. In some examples, block 1208 may be executed similar to the process set forth above for block 406. At block 1210, the device may capture background scenes for background purposes/image replacement as discussed herein.

The logic may then proceed to blocks 1212 and/or 1214. At block 1212 the device may engage in a continuous improvement process, creating and/or updating the relevant face 3D model at block 1212 and creating blend shapes at block 1213. At block 1214 the device may engage in another continuous improvement process, creating and/or updating the relevant face AI model.

Figure 13:
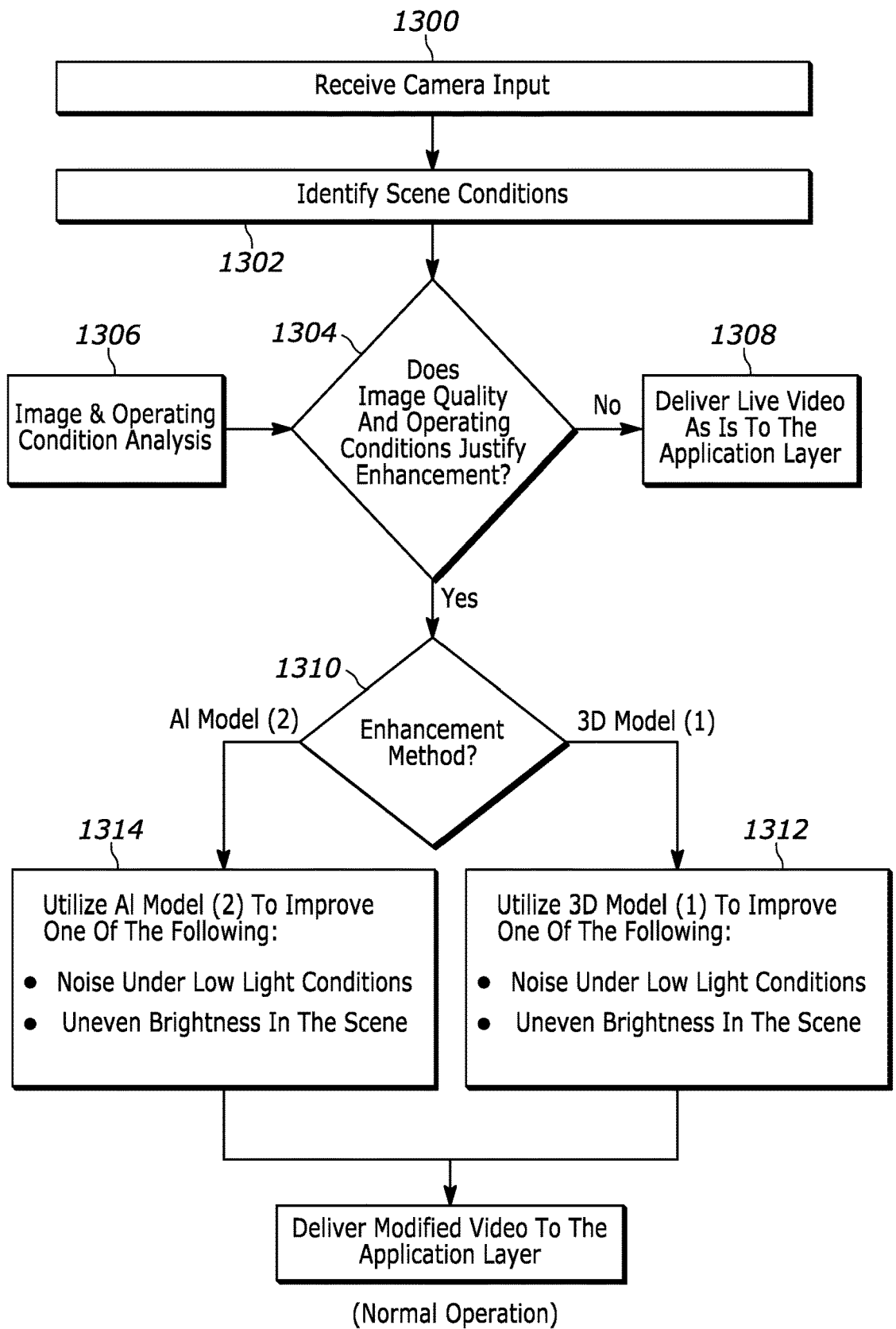

FIG. 13 shows still other example logic that may be executed consistent with present principles, such as during deployment and/or normal operation. Beginning at block 1300, the device may receive camera input similar to the process set forth above for block 400. The logic may then proceed to block 1302 where the device may identify scene conditions similar to the process set forth above for block 402.

Thereafter, the logic may proceed to decision diamond 1304 where the device may determine whether the image quality of the images from the camera and operating conditions of the device justify enhancement (e.g., of the video stream), as determined from image and operating condition analysis 1306. Responsive to a negative determination at diamond 1304, the logic may proceed to block 1308 to deliver the live video as-is (e.g., without 3D model/AI model correction) to the application layer.

However, responsive to an affirmative determination at diamond 1304, the logic may instead proceed to diamond 1310 where the enhancement method may be selected (e.g., use AI model to enhance, or use 3D model to enhance). Thus, responsive to the relevant 3D model being selected, the logic may proceed to block 1312 where the device may use the 3D model to improve noise under low light conditions and uneven brightness in the scene. However, responsive to the relevant AI model being selected the logic may instead move to block 1314 where the device may use the AI model to improve noise under low light conditions and uneven brightness in the scene. Then from either of blocks 1312 or 1314 the logic may proceed to block 1316 to deliver the modified video to the application layer (e.g., for transmission and/or presentation).

Figure 14:
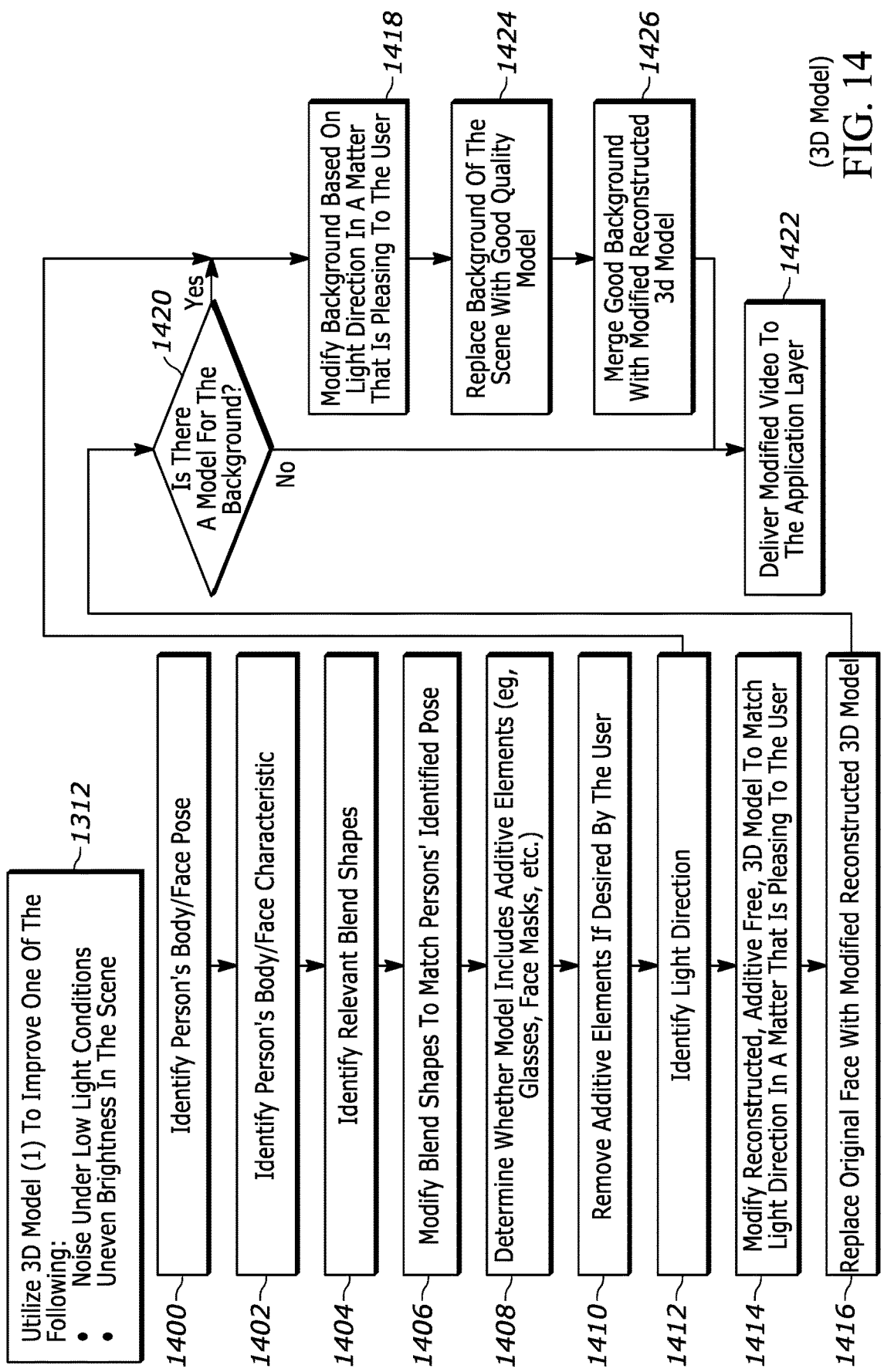

FIG. 14 shows still other logic that may be executed consistent with present principles, specifically in reference to a 3D model for use consistent with present principles. For example, the logic of FIG. 14 may be executed in conjunction with block 1312 described above.

Accordingly, at block 1400 the device may identify the relevant person's body/face pose. Then at block 1402 the device may identify the person's body/face characteristic(s). Thereafter the logic may proceed to block 1404 where the device may identify the relevant blend shapes and then, at block 1406, modify the blend shapes to match the person's identified pose.

Thereafter the logic may proceed to block 1408 where the device may determine whether the model includes additive elements such as glasses, face masks, etc. Then at block 1410 the device may remove the additive elements if desired by the user and then proceed to block 1412. At block 1412 the device may identify the direction of light to, at block 1414, modify the reconstructed, additive-free 3D model to match the light direction in a matter that is pleasing to the user. Then at block 1416 the device may replace the original face with the modified reconstructed 3D model. Also note that from block 1412 in some examples the logic may also proceed to block 1418 where the device may modify the background portions based on the light direction in a matter that is pleasing to the user.

Further note that from block 1416 the logic may proceed to decision diamond 1420. At diamond 1420 the device may determine whether there is a model for the background. An affirmative determination at diamond 1420 may cause the logic to proceed to block 1418 as described above. However, a negative determination may instead cause the logic to proceed directly to block 1422 where the device may deliver the modified video to the application layer (e.g., without background modifications).

But assuming there is a model for the background, the logic may move to block 1418 as described above and then to block 1424 where the device may replace parts of the background of the scene with the good-quality model. Then at block 1426 the device may merge the good existing background portions with the modified reconstructed 3D model portions.

Figure 15:
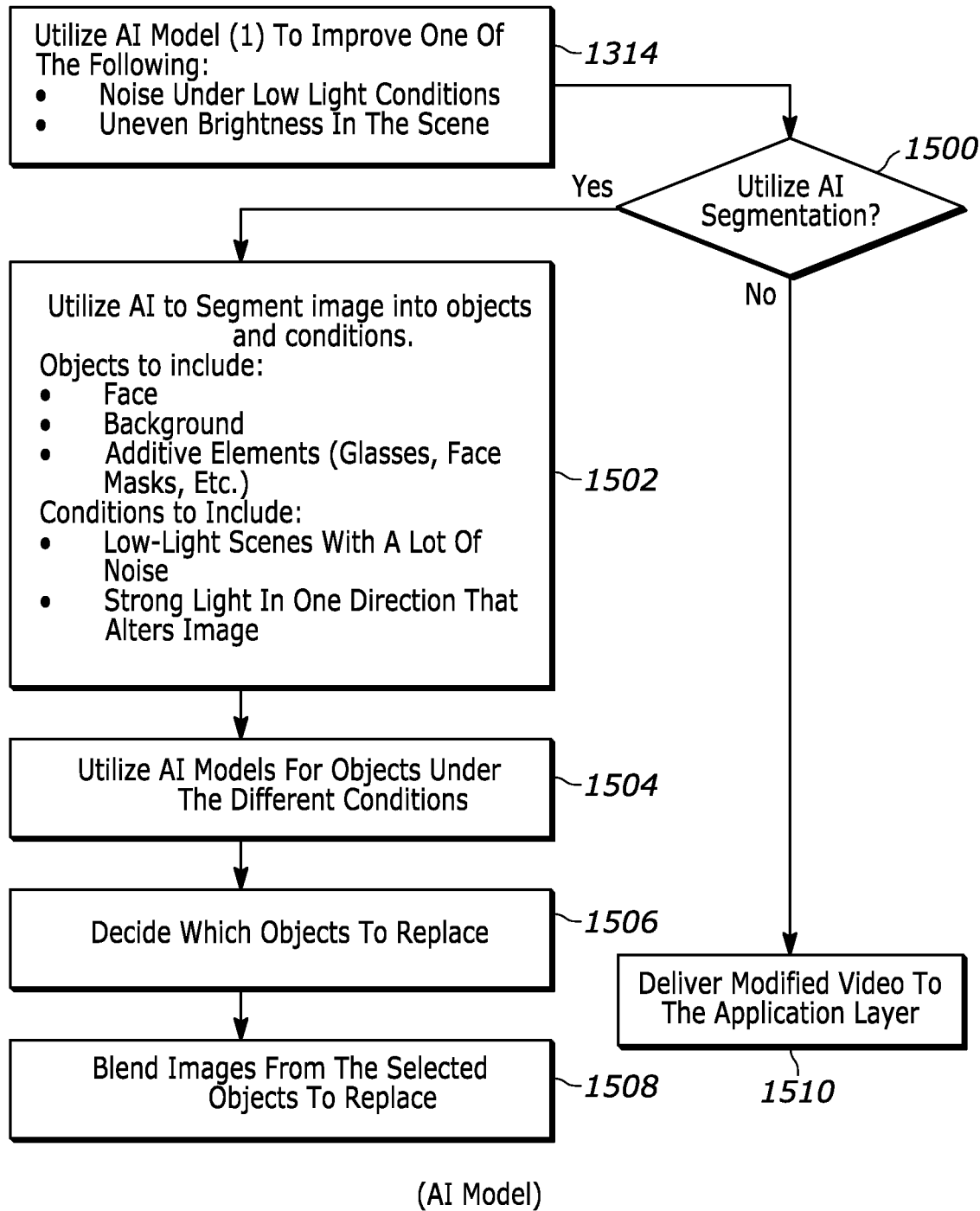

Continuing the detailed description in reference to FIG. 15, additional logic is shown that may be executed consistent with present principles, specifically in reference to an AI model for use consistent with present principles. For example, the logic of FIG. 15 may be executed in conjunction with block 1314 described above or thereafter.

Accordingly, at decision diamond the device may determine whether to use AI segmentation. A negative determination at diamond 1500 may cause the logic to proceed directly to block 1510 where the device may deliver a modified video to the application layer consistent with present principles. However, an affirmative determination at diamond 1500 may instead cause the logic to proceed to block 1502.

At block 1502 the device may use AI to segment the image(s) into objects and conditions. Objects to include may include face, background(s), and additive elements such as glasses and face masks. Conditions to include may include low-light scenes with a lot of noise and strong light in one direction that alters the image(s).

From block 1502 the logic may then proceed to block 1504 where the device may utilize the AI models for objects under the different conditions. Then at block 1506 the device may decide which objects to replace and then, at block 1508, blend the images from the selected objects to replace. The logic may then move to block 1510 to deliver the modified video to the application layer with the video modified per steps 1502-1508.

It may now be appreciated that present principles provide for an improved computer-based user interface that increases the functionality of the devices disclosed herein through improved digital image quality during video streaming. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least a first device, comprising:
at least one processor; and
storage accessible to the at least one processor and comprising instructions executable by the at least one processor to:
facilitate a video stream;
receive input from a camera in communication with the first device;
identify, based on the input from the camera, at least one lighting condition of a scene comprising a person;
responsive to a first lighting condition of the at least one lighting condition satisfying a first criterion, transmit a first video stream from the camera to at least a second device different from the first device, the first video stream showing the person's face as captured by the camera;
responsive to the first lighting condition not satisfying the first criterion, identify one or more parameters related to the person, use a model to generate a three-dimensional (3D) representation of at least part of the person's face according to the one or more parameters, and transmit a second video stream to at least the second device, the second video stream showing the 3D representation of at least part of the person's face according to the one or more parameters; and
responsive to the first lighting condition not satisfying the first criterion, present a graphic on a display, the graphic being different from the 3D representation and the graphic indicating that the 3D representation is being used for the second video stream.

2. The at least first device of claim 1, wherein the second video stream also shows part of a background as captured by the camera.

3. The at least first device of claim 1, wherein the model comprises a 3D model, the 3D model generated using facial data associated with the person as gathered prior to the video stream.

4. The at least first device of claim 1, wherein the model comprises an artificial intelligence model comprising one or more artificial neural networks trained for generating the 3D representation using training images gathered prior to the video stream.

5. The at least first device of claim 1, wherein the first criterion relates to lighting of the person's face.

6. The at least first device of claim 1, wherein the 3D representation as shown in the second video stream is animated to correspond to actual facial movements of the person as captured by the camera.

7. The at least first device of claim 1, wherein the second video stream shows a first part of the person's face according to the 3D representation and shows a second part of the person's face according to images captured by the camera.

8. The at least first device of claim 1, wherein the second video stream replaces the person's face as shown in images from the camera with the 3D representation.

9. A method, comprising:
receiving input from a camera in communication with a first device;
identifying, based on the input from the camera, at least one lighting condition of a scene, the scene comprising a user;
responsive to a first lighting condition of the at least one lighting condition satisfying a first criterion, transmitting a first real-time video stream to a second device different from the first device, the first real-time video stream showing the user's face as captured by the camera;
responsive to the first lighting condition not satisfying the first criterion, using a model to generate a three-dimensional (3D) representation of at least part of the user's face according to one or more parameters related to the user and transmitting a second real-time video stream to the second device, the second real-time video stream showing the 3D representation of at least part of the user's face according to the one or more parameters; and
responsive to the first lighting condition not satisfying the first criterion, present a graphic on a display, the graphic being different from the 3D representation and indicating that the 3D representation is being used for the second real-time video stream.

10. At least one computer readable storage medium (CRSM) that is not a transitory signal, the at least one computer readable storage medium comprising instructions executable by at least one processor of a first device to:
facilitate a video stream;
receive input from a camera in communication with the first device;
identify, based on the input from the camera, at least one lighting condition of a scene comprising a person;
responsive to a first lighting condition of the at least one lighting condition satisfying a first criterion, transmit a first video stream from the camera to at least a second device different from the first device, the first video stream showing the person's face as captured by the camera;
responsive to the first lighting condition not satisfying the first criterion, identify one or more parameters related to the person, use a model to generate a three-dimensional (3D) representation of at least part of the person's face according to the one or more parameters, and transmit a second video stream to at least the second device, the second video stream showing the 3D representation of at least part of the person's face according to the one or more parameters; and
responsive to the first lighting condition not satisfying the first criterion, present a graphic on a display, the graphic being different from the 3D representation and the graphic indicating that the 3D representation is being used for the second video stream.

11. The at least first device of claim 1, wherein the graphic comprises text indicating that the 3D representation is being used.

12. The at least first device of claim 1, wherein the graphic comprises a line indicating division between the 3D representation and the person's face as both captured by the camera and shown in the second video stream.

13. The at least first device of claim 1, wherein the graphic is presented as part of a graphical user interface (GUI) presented on the display, the GUI comprising a selector that is selectable to command the at least one processor to stop using the 3D representation and to instead provide real-world video showing the person's face as captured by the camera.

14. The at least first device of claim 1, wherein the instructions are executable to:
responsive to the first lighting condition satisfying the first criterion, train the model to generate the 3D representation of at least part of the person's face.

15. The at least first device of claim 1, wherein the instructions are executable to:
responsive to the first lighting condition satisfying the first criterion, prompt the person regarding whether to train the model to generate the 3D representation of at least part of the person's face.

16. The method of claim 9, wherein the graphic comprises text indicating that the 3D representation is being used.

17. The method of claim 9, wherein the graphic comprises a line indicating division between the 3D representation and the person's face as both captured by the camera and shown in the second real-time video stream.

18. The method of claim 9, wherein the graphic is presented as part of a graphical user interface (GUI) presented on the display, the GUI comprising a selector that is selectable to provide a command to stop using the 3D representation and to instead provide real-world video showing the user's face as captured by the camera.

19. The method of claim 9, comprising:
responsive to the first lighting condition satisfying the first criterion, training the model to generate the 3D representation of at least part of the user's face.

20. The method of claim 9, comprising:
responsive to the first lighting condition satisfying the first criterion, prompting the user regarding whether to train the model to generate the 3D representation of at least part of the user's face.

* * * * *